Feb. 1, 1949.   A. V. D. WILLGOOS   2,460,778
TORQUE REGULATING DEVICE FOR COMPRESSORS
Filed April 12, 1946   2 Sheets-Sheet 1

INVENTOR.
Andrew V. D. Willgoos
BY
Ernest D. Given
ATTORNEY

Feb. 1, 1949.  A. V. D. WILLGOOS  2,460,778
TORQUE REGULATING DEVICE FOR COMPRESSORS
Filed April 12, 1946  2 Sheets-Sheet 2
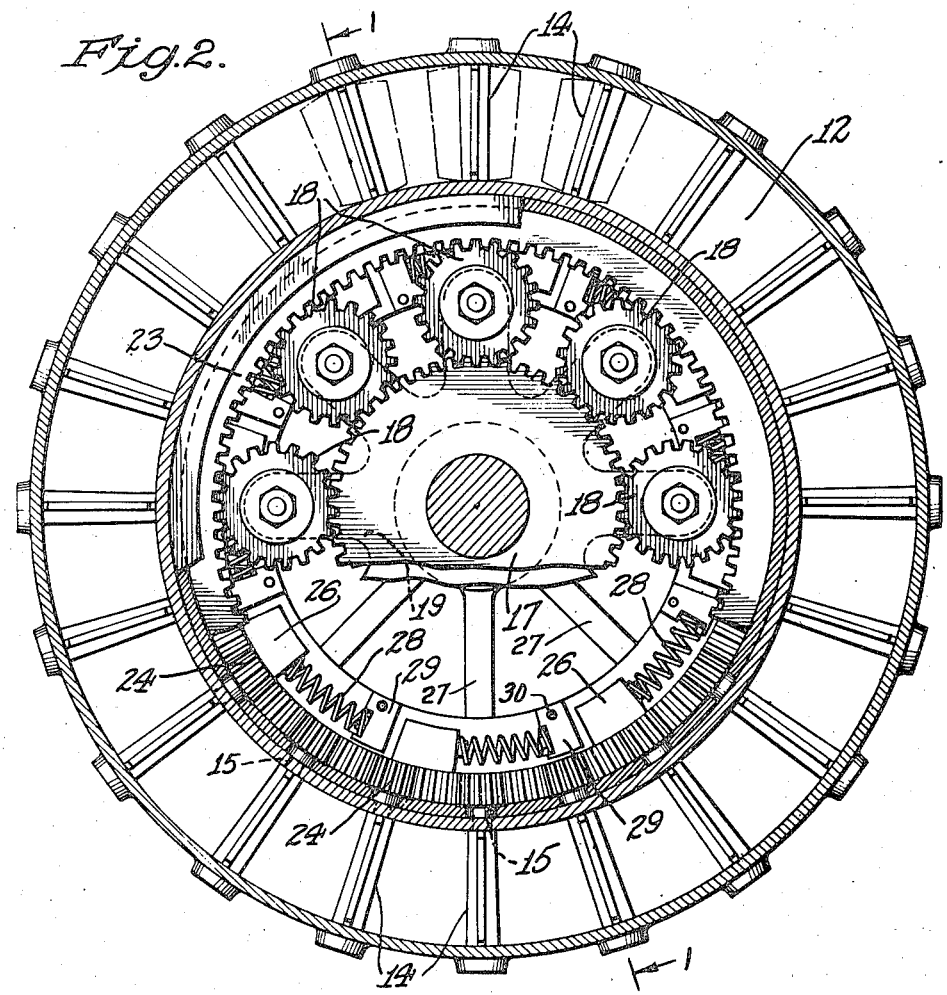
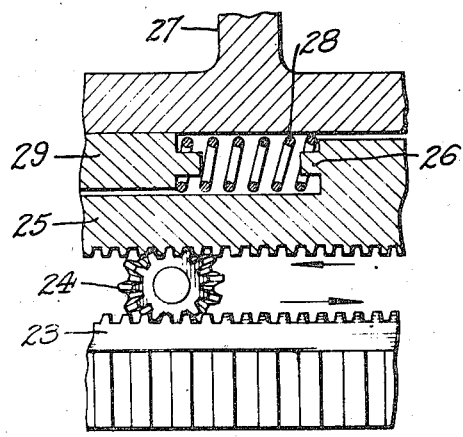
INVENTOR.
Andrew V. D. Willgoos
BY
Ernest D. Given
ATTORNEY Patented Feb. 1, 1949

2,460,778

UNITED STATES PATENT OFFICE 2,460,778

TORQUE REGULATING DEVICE FOR COMPRESSORS

Andrew V. D. Willgoos, West Hartford, Conn., assignor to United Aircraft Corporation, East Hartford, Conn., a corporation of Delaware Application April 12, 1946, Serial No. 661,815

4 Claims. (Cl. 230—114)

This invention relates to compressors or superchargers for power plants, particularly for aircraft, and it has for its object to provide a novel and improved means for regulating such devices.

Another object of the invention is to provide simple and efficient means for automatically regulating the torque required to operate a compressor or supercharger under varying conditions of atmospheric pressure.

Another object is to limit or regulate the torque input or the output of a compressor in accordance with changes in atmospheric pressure resulting from changes in aircraft altitude.

Still another object is to provide a torque regulating device of the foregoing type having novel and improved details of construction and features of operation.

Various other objects and advantages will be apparent as the nature of the invention is more fully disclosed.

It is well known that the torque required to drive an aircraft supercharger or compressor at a given speed varies with the density of the air or fluid being pumped. Hence, at a high altitude, much less torque is required to drive the compressor than at a low altitude.

Assuming that the driving mechanism is designed with a normal factor of safety for operating the compressor or supercharger at its critical altitude, it follows that at low altitude, for example at or near sea level, the drive will be overloaded unless means are provided for throttling or reducing the amount of air pumped by the compressor. If the pilot is depended upon to reduce the amount of air flow to the compressor at reduced altitudes, it introduces one more thing for him to do, and, furthermore, he might still overload the drive through error in setting controls or reading gauges.

The present invention provides means for automatically maintaining approximately constant torque to the compressor or supercharger of an aircraft for all altitudes from sea level to critical altitude. In the embodiment disclosed herein for purposes of illustration, I accomplish this by providing a series of vanes or shutters in the inlet to the compressor rotor so arranged that they respond to the amount of torque put into the drive shaft and regulate the air flow in proportion to a predetermined torque value. The actuating means for the shutters may include a gear train between the compressor drive shaft and the rotor or impeller driven shaft so arranged that a torque responsive member acts on the shutters to open or close them as required. If desired, this device may also be used to control a variable output compressor instead of regulating the input.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Fig. 2 is a view substantially in transverse section taken on line 2—2 of Fig. 1, some parts being further broken away to show the construction; and Fig. 3 is a detail section taken on line 3—3 of Fig. 1.

Figure 1:
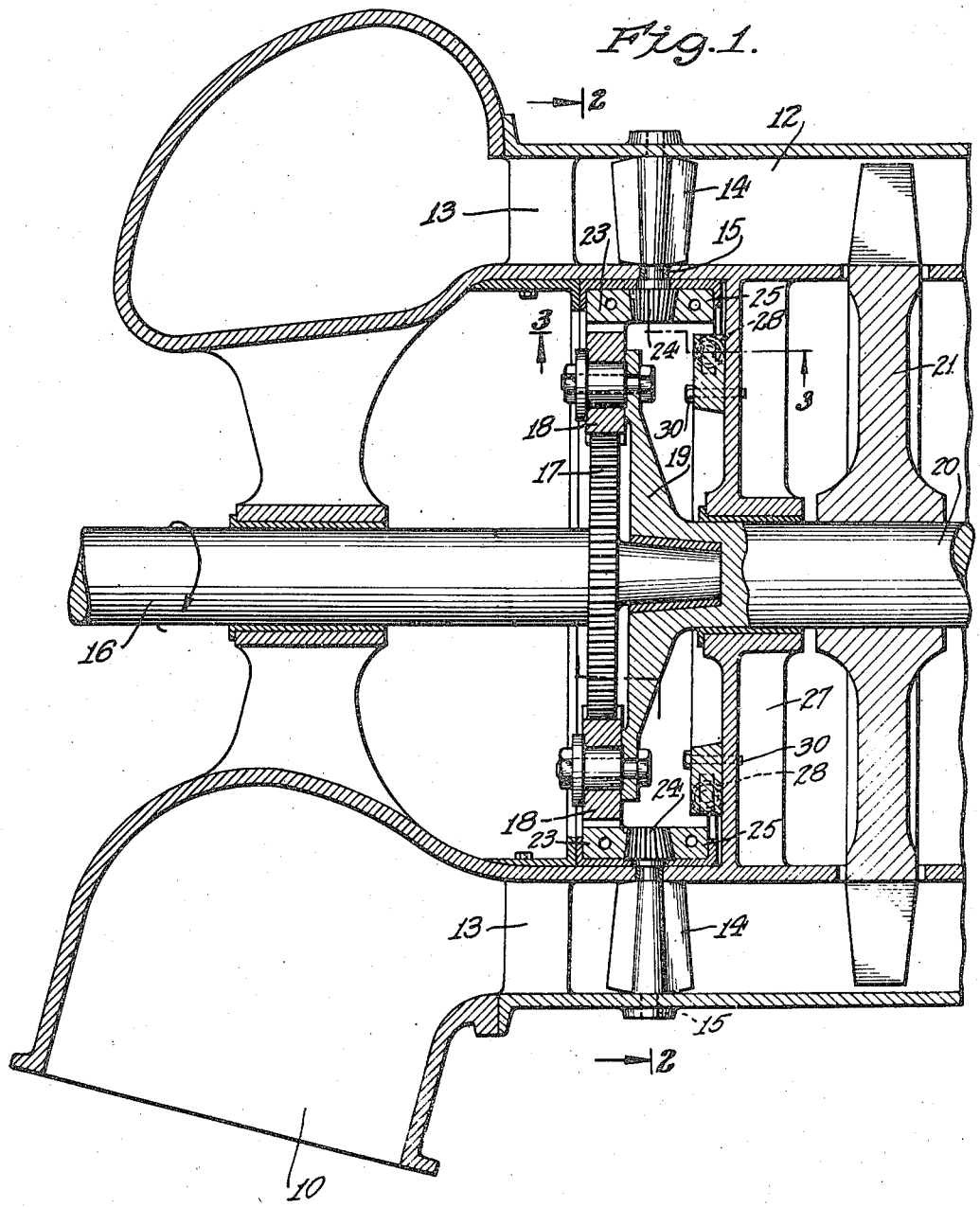
Figure 1 is a longitudinal sectional view through an internal combustion engine compressor embodying the envention taken substantially on the line 1—1 of Fig. 2.

In the following description certain specific terms are used for convenience in referring to the various details of the invention. These terms, however, are to be interpreted as broadly as the state of the art will permit.

In the drawings, Fig. 1 shows a compressor or supercharger comprising an inlet 10 leading to the annular air passage 12 which contains a series of spaced stator blades 13 and a circular series of radially disposed vanes or shutters 14 mounted on rotatable axles 15 which are journaled in the concentric walls of the chamber 12.

The compressor driving shaft 16 carries a driving gear 17 meshing with a circular series of planetary pinions 18 carried by a pinion cage or carrier 19 which is mounted on the driven impeller shaft 20. The shaft 20 carries one or more compressor rotors or impellers 21 rotating in passage 12, it being understood that any desired number of impeller stages may be employed.

The pinions 18 mesh with a ring reaction gear 23 which engages bevel gears or pinions 24 secured to the axles 15 of shutters 14, and the pinions 24 in turn engage a spring-loaded torque reaction gear 25.

The resistance applied to the torque reaction gear 25 may be by any suitable means such as oil pressure, springs, etc., but in the embodiment illustrated herein this reaction is taken on springs 28 which are compressed between lugs 26 on gear 25 and lugs 29 which are secured by bolts 30 to the stationary spider 27, as illustrated in Figs. 2 and 3. The springs 28 are set to yield at some predetermined value, thus closing the shutters 14.

Considering now the operation of the structure just described, and assuming any one predetermined condition of torque, which may, for example, be a desired torque for the apparatus, the torque reaction gear 25 will attain a stationary position after the springs 28 have been compressed by an amount proportional to the torque. Under these circumstances the pinions 24 will be stationary and the shutters 14 will have been adjusted to a position proportional to the position of torque reaction gear 25, which position, as aforesaid, is proportional to the torque existing at the time. The ring reaction gear 23 will also be stationary as it is in mesh with the pinions 24. Thus under these conditions the drive will be from the shaft 16 through the planetary pinions 18 to the carrier 19 and shaft 20 and thence to the impeller 21.

Assuming now the conditions change, so that the impeller is subjected to an increased torque, for example by being supplied with air at a greater density. Inasmuch as the ring reaction gear 23, the bevel pinions 24 and the torque reaction gear 25 are all movable within certain predetermined limits, this increased torque will serve to move these elements so as further to compress the springs 28. This additional compression is caused by the relative movement of the several parts 23, 24 and 25 due to the increased torque which causes an increased amount of force to be applied from the pinions 18 to the ring reaction gear 23. As the springs 28 offer a progressively increased resistance to applied force as they are further compressed, an equilibrium will again be established in a rapid and automatic manner, so that the parts 23, 24 and 25 will come to rest at a new equilibrium position. At this position the shutters 14 will have been moved to cut down the amount of fluid passing through the compressor, so as to bring the torque to a desired point and so that the load on the compressor will be made substantially uniform. As the vanes or shutters 14 are rigid with the bevel pinions 24, it will be seen that they will be adjusted proportionately to the torque in a direct manner; that the reaction gear 23 is movable to a predetermined limited extent only; that the resilient means or springs 28 will determine the position of the parts 23, 24 and 25 automatically in response to the applied torque to the gear train intermediate the shafts 16 and 20; and that the entire mechanism is completely automatic in its operation and is mechanical throughout.

In operation, let it be assumed that the springs 28 are set to hold the torque reaction gear 25 in a fixed position against the stops with a pressure capable of permitting a transmission of power through the gear train of, say, 500 H. P. at 10,000 R. P. M. of the drive shaft 16 at an air density equal to 20,000 feet altitude. If conditions of speed were maintained, and the aircraft containing this compressor were brought down to sea level, the air density at sea level would be sufficient to cause severe overloading or would require a drive shaft torque of approximately twice that required at 20,000 feet. In my device, however, under such conditions the torque reaction gear 25 will not be loaded sufficiently to carry this amount of increased power, and, therefore, it will be caused to move and further compress the springs 28, and, in so doing, it will rotate the pinions 24 and shutters 14, thereby throttling the air to the compressor and thus limiting the torque that can be applied to the compressor drive shaft 16.

The torque regulating device disclosed herein may be applied equally well to various types of compressors, such as the centrifugal, axial, positive displacement, etc. likewise, various types of gearing may be employed, since any gearing having a reaction member set to yield at some predetermined value is suitable. Furthermore, the shutters or throttling means need not be applied to the inlet side of the compressor. The device may also be applied to regulate the output of a compressor by adjusting the angular relationship of the shutters which may be designed to act as stator blades in the compressor so that the angles of attack of the blades will bear a definite relationship to the torque input, thus changing the characteristics of the compressor to suit varying conditions of operation.

It will also be evident to those skilled in the art that the invention is capable of various further modifications and adaptations within the scope of the appended claims.

What is claimed is:

1. A compressor for internal combustion engines comprising a fluid passage, a plurality of movable shutters controlling the passage of fluid therein, a driving shaft, an impeller driven by said shaft for pumping fluid through said passage, a gear train connecting said driving shaft to said impeller including a reaction gear movable to a predetermined limited extent only, means responsive to the movement of said reaction gear for controlling the adjustment of said shutters, and means mechanically responsive to variations in the compressor input torque for automatically controlling the position and movement of said reaction gear.

2. A compressor for internal combustion engines comprising a fluid passage, a plurality of rotatable shutters controlling the passage of fluid therein, a driving shaft, a driven shaft, an impeller on said driven shaft for pumping fluid through said passage, a driving gear carried by said driving shaft, a plurality of pinions carried by said driven shaft and meshing with said driving gear, a ring reaction gear also meshing with said pinions, bevel pinions on said shutters meshing with said ring gear, a torque reaction gear also meshing with said bevel pinions, and resilient means acting on said torque reaction gear and adapted to yield to an extent dependent upon the torque of said driven shaft as imparted from said ring gear through said bevel pinions to said torque reaction gear to rotate said bevel pinions and thereby to position said shutters.

3. A compressor for internal combustion engines comprising an annular fluid passage, a circular series of radially disposed shutters rotatably mounted in said passage for controlling fluid flow therethrough, a driving shaft, a driven shaft, an impeller on said driven shaft rotatable in said passage, a driving gear carried by said driving shaft, a plurality of pinions carried by said driven shaft and meshing with said driving gear, a ring reaction gear also meshing with said pinions, bevel pinions on said shutters meshing with said ring reaction gear, a torque reaction gear also meshing with said bevel pinions and arranged for a predetermined limited movement, and compression springs acting on said torque reaction gear and arranged to yield to an extent dependent upon the torque of said driven shaft to control the rotated position and movements of said reaction gears and said bevel pinions and hence the position and movements of said shutters.

4. A gaseous fluid compressor, comprising means defining a passage for gaseous fluid from an intake point to a delivery point, compression means located in said passage and effective to compress the fluid in said passage between said intake point and said delivery point, means for mechanically driving said compression means, including a rotatable driving shaft and a mechanical train driven by said driving shaft and connected to said compression means for driving same, adjustable means in said passage for controlling flow of gaseous fluid therethrough, a member movable to a predetermined extent in response to the input torque of said compressor, means connected to said mechanical train for moving said member to a position which is a function of the input torque, and means controlled in position by said member and connected to said adjustable means for moving same to positions which are a predetermined function of the positions of said member respectively.

ANDREW V. D. WILLGOOS.

REFERENCES CITED

The following references are of record in the file of this patent:

UNITED STATES PATENTS

| Number | Name | Date |
| --- | --- | --- |
| 2,178,405 | Reggio | Oct. 31, 1939 |
| 2,341,974 | Browne | Feb. 15, 1944 |
| 2,374,708 | Shoults | May 1, 1945 |